Jan. 24, 1961 F. T. BACON 2,969,315
BIPOLAR ELECTRODE FOR ELECTRIC BATTERIES
Filed Aug. 21, 1957 2 Sheets-Sheet 1
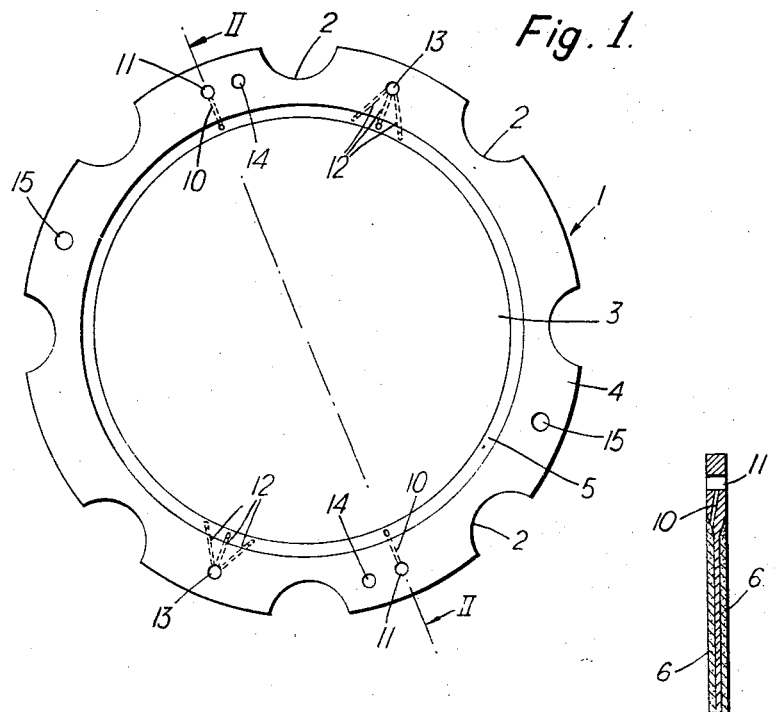
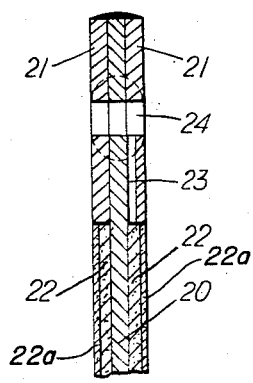
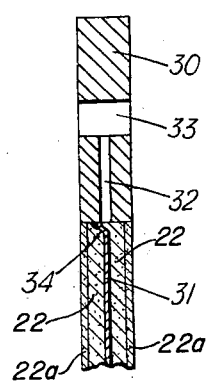
Inventor
Francis T. Bacon
By Ralph B. Stewart
Attorney Jan. 24, 1961 F. T. BACON 2,969,315
BIPOLAR ELECTRODE FOR ELECTRIC BATTERIES
Filed Aug. 21, 1957 2 Sheets-Sheet 2

Inventor
Francis T. Bacon
By Ralph B. Stewart
Attorney

United States Patent Office 2,969,315
Patented Jan. 24, 1961

---

2,969,315

BIPOLAR ELECTRODE FOR ELECTRIC BATTERIES

Francis Thomas Bacon, Westfield, Little Shelford, England, assignor to E.R.A. Patents Limited, Leatherhead, England, a British company Filed Aug. 21, 1957, Ser. No. 679,457

Claims priority, application Great Britain Aug. 23, 1956

6 Claims. (Cl. 204—284)

This invention relates to electric cells of the hydrogen-oxygen type which may be used either as primary batteries or alternatively as electrolysers for the production of pure hydrogen and oxygen. A cell intended for use as a primary battery is described in U.S. Patent No. 2,716, 670, and includes a pair of porous nickel electrodes mounted in a container with electrolyte in the space between the two electrodes and hydrogen and oxygen supplied respectively to the two spaces between the outer side of each electrode and the wall of the cell. As described in that specification, each electrode has a lesser pore size on its outer surface than on its inner surface, and in operation each gas is maintained at a slightly higher pressure than the electrolyte so that it forces the electrolyte out of the large pores but is prevented from bubbling into the electrolyte by the increased effect of surface tension in the small pores. In general an electric battery requires to be built up from a number of such cells and when using the construction just described the total assembly tends to become unduly bulky.

According to the present invention two layers of porous nickel are carried on opposite sides of a common supporting or backing plate with space between the plate and the inner surface of each layer for the access of the respective gas. The pore sizes of the nickel layers vary in the manner described above and the result is a bi-polar electrode formed as a single structure. By using electrodes of this type a complete battery or electrolyser may be assembled with a very considerable saving of space. Instead of a number of self-contained cells, a stack of electrodes insulated from one another are secured together with the space between adjacent electrodes filled with electrolyte, and gas introduced between the inner surface of each individual layer of porous nickel and its supporting plate. This is made possible because with an assembly of individual cells the oxygen electrode of one cell is connected electrically by way of the backing plate to the hydrogen electrode of the next cell. With a construction in accordance with the present invention these two adjacent electrodes are formed as a single structure and the need for any separate container for each individual cell is thereby eliminated.

Preferably the layers of porous nickel on each side of the supporting plate are located in recesses in the sides of the plate. The plate may conveniently be circular in shape and may be made of nickel, or nickel-plated steel. In one form of construction the recesses are formed in a solid plate. Alternatively, a circular central web may have a ring secured to it around its edge on each side so that the central space of each ring defines the recess on that side. Yet again, a central web may be secured symmetrically within an outer ring of greater thickness to leave the necessary recess on each side. In any of these constructions the peripheral or rim portion is thicker than the central portion and may conveniently be formed with ports through which the respective gases may be led into and out of the space between the supporting plate and the layers of porous nickel. It will be understood that the outer layer of porous nickel having the lesser pore size is connected to the rim portion of the supporting plate throughout its periphery and forms a closed gas chamber within the recess. In the case of an electrolyser it is, of course, only necessary to lead the gases away, while in a primary battery it may be necessary to circulate at least the hydrogen. The ports formed in the peripheral portions may communicate with a passage transverse to the plane of the electrodes, the passages in adjacent electrodes being in register with one another when the electrodes are assembled in a stack so as to form a continuous passage or manifold for the gas.

Constructions in accordance with the invention will now be described in more detail by way of example with reference to the accompanying drawings in which:

Figure 1 is a view of a bi-polar electrode in accordance with the invention;

Figure 2 is a sectional view on the line II—II of Figure 1;

Figure 3 is a sectional view of part of a modified form of electrode;

Figure 4 is a view corresponding to Figure 3 of a further modification; and

Figure 5:
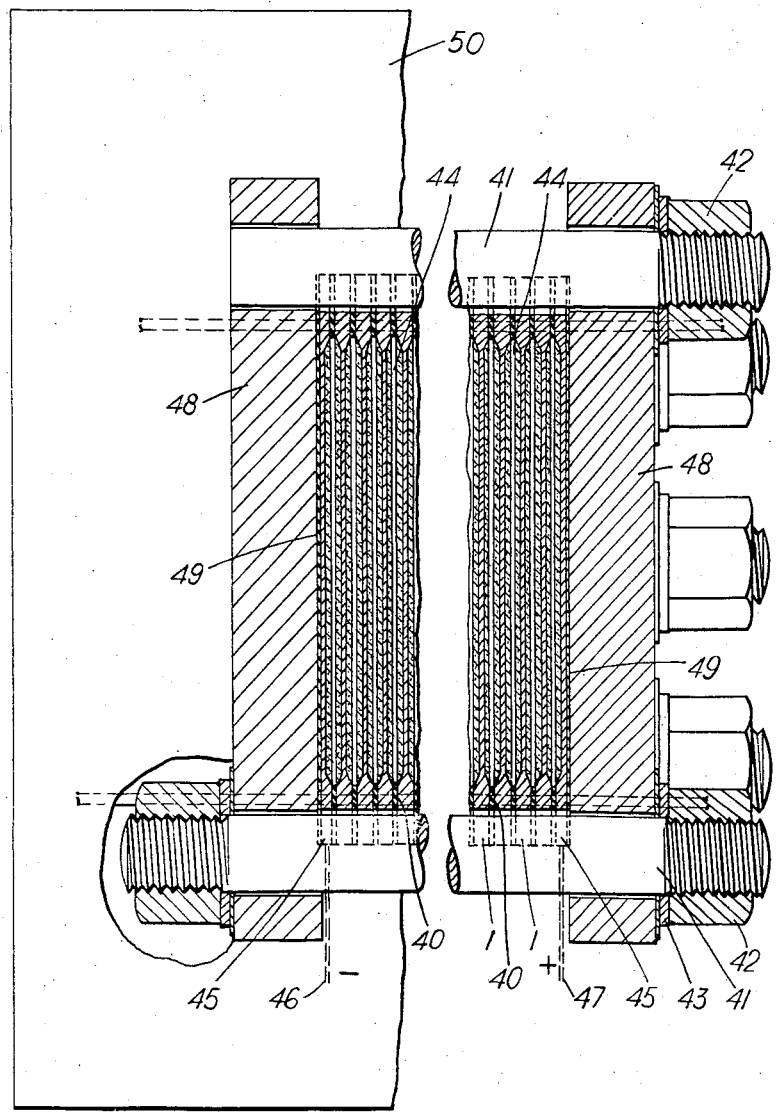
Figure 5 is a sectional view with the central portion broken away of a battery built up from a number of electrodes, as shown in Figures 1 and 2.

The electrode shown in Figures 1 and 2 is formed of a circular backing plate 1 of nickel or nickel-plated steel, having part-circular cutaway portions 2 for the reception of bolts. Each side of the plate is formed with a recess 3 surrounded by a rim 4, the sides of the recesses being sloped as shown at 5. Each electrode may be in the region of four to six inches in diameter and for reasons of economy of space is made as thin as is practicable. Each recess is of a depth equal to approximately one third of the thickness of the plate, for example between one thirty-second and one sixteenth of an inch deep, giving a total thickness of plate in the region of five thirty-seconds to three sixteenths of an inch in a particular example. Each recess is filled with a layer of porous nickel 6, as seen in Figure 2. Broadly speaking, the porous nickel layers may be formed as described in U.S. Patent No. 2,716,670 and are protected against corrosion as described in that patent. The oxygen layer may be formed by a number of processes, for example that described with reference to Example 1 of the patent just mentioned, the recesses in the plate constituting the mould for the nickel powder.

The lower part of the layer with the larger pores, that is to say the inner part which is in contact with the gas, is made by dusting relatively coarse nickel powder of a particle size of 65 to 75 microns into the recess in the plate and sintering without compacting under pressure at a temperature between 1325° C. and 1350° C. for one hour in an atmosphere of hydrogen or of hydrogen and nitrogen.

The fine pore portion forming the liquid side of the layer is made of A-nickel powder, having an average particle size of 4 to 5 microns. This is painted on as a suspension in alcohol and is then sintered at 1000° C. for half an hour. After this the process is repeated until any leaks are sealed up, the A-nickel being rubbed in and any excess rubbed off, two such repetitions usually being sufficient.

As an alternative to this process the oxygen layer may be made in accordance with a modified version of Example 2 of Patent No. 2,716,670. Thus the nickel powder for the main part of the layer may have an average particle size of 7 to 9 microns (D-nickel) or alternatively of 4 to 5 microns (A-nickel). This is spaced by mixing it with a spacing agent consisting of 100–240 mesh ammonium bicarbonate in the proportion of one part by weight to three to five parts of nickel. The mixture of nickel powder and ammonium bicarbonate is then pressed in a rubber press which exerts a uniform pressure of the order of 4000 pounds per square inch. The mixture is then sintered at 1000° C. to 1150° C. for half an hour to three hours. The fine pore layer of A-nickel is then applied as described above and is sintered at 950° C. to 1000° C. for half an hour to one hour.

In both the examples just given, the resulting layer is then soaked in a saturated solution of lithium hydroxide, after which it is dried in air at 120° C. and then heated to 800° C. for 15 minutes in a hydrogen-nitrogen mixture in order to fuse the lithium hydroxide and distribute it uniformly all over the electrode. Finally it is heated in air at 800° C. for 15 minutes to oxidise it. During the sintering process the underside of the plate requires to be supported on a piece of shaped graphite, or a refractory block, to prevent it sagging under its own weight.

The hydrogen layer may be made substantially as described in the second of the two examples just given, except that the main part is of B-nickel powder which consists essentially of smaller particles than A-nickel, these particles being interlocked in a fibre-like fashion which are stronger than the loose compacts in the A-nickel and also are themselves interlocked. This powder is spaced with 100–240 mesh ammonium bicarbonate in the proportion of one part by weight to three or four parts of nickel powder. Hand pressure is applied through a flat plate and the mixture is sintered at 800° C. for half an hour. The fine pore layer is A-nickel applied as described above and sintered at 750° C. to 800° C. for half an hour. As previously mentioned, it is usually necessary to repeat this process twice in order to seal any leaks.

The hydrogen layer is sintered in position on the supporting plate after the sintering of the oxygen layer because the sintering is at a lower temperature. During the final process of oxidation of the oxygen layer, the hydrogen layer, which is supported face downwardly on a flat plate, is prevented from becoming oxidised by supplying it with a hydrogen-nitrogen mixture through a hole in the flat plate.

When the electrode is to be used in a primary battery, the layer of porous nickel on the hydrogen side of the supporting plate is separated from the latter by a thin perforated sheet of pure nickel. This is too thin to appear in the drawings but is, for example, about .005 inch thick with about 400 holes per square inch, each hole being about .02 inch diameter. This sheet is dimpled at intervals of about half an inch in each direction and is sintered onto the supporting plate at points in the region of each dimple. This leaves a gap of about .01 inch between the perforated sheet and the supporting plate which allows easy access of hydrogen to all parts of the porous nickel layer which is sintered onto and keys to the front face of the perforated sheet. Thus the hydrogen may be circulated rapidly in this gap with the main object of removing the water formed during the operation of the cell, in the form of steam. As an alternative to the perforated sheet, nickel gauze of fine mesh may also be used.

The sectional view of Figure 2 is taken through the oxygen ports 10 which give access to the porous nickel layer 6. These ports each lead from a passageway 11 which is transverse to the plane of the electrode, and which, when a number of electrodes are assembled together, is in register with adjacent passageways, forming a continuous manifold for the passage of gas. The hydrogen ports 12 consist each of three branches diverging from a passageway 13 and lead to the porous nickel layer on the other side of the electrode. A third pair of passageways 14 are provided for the circulation of electrolyte, while holes 15 are provided for purposes of location during assembly.

In the modified construction of electrode shown in Figure 3, a central web 20 has a ring 21 secured around its edge on each side, for example, by means of seam and spot welding. This leaves a recess on each side of the electrode for the reception of the porous nickel layers shown as 22 and 22a. Access to the gas space behind each nickel layer is given by ports 23 communicating with a passageway 24. The nickel layers 22 and 22a may be formed as previously described and the hydrogen layer may be separated from the web 20 by a perforated nickel sheet which, as previously mentioned, is too thin to appear in the drawing.

In the modification of Figure 4 a single ring 30 replaces the rings 21 of Figure 3, while a central web or diaphragm 31 is welded symmetrically within the central space of the ring. Ports 32 for the passage of gas lead from a passageway 33 and these ports are centrally located for purposes of strength. In order to ensure that each port communicates with the correct side of the diaphragm 31, the latter is dimpled in the appropriate direction, as seen at 34, in the immediate neighbourhood of each port.

Figure 5 shows a number of electrodes in accordance with Figures 1 and 2 assembled together to form a complete stack or battery. Each adjacent pair of electrodes 1 is separated by a gasket 40 of insulating material. This leaves a space 44 between the faces of adjacent electrodes for the reception of the electrolyte which is normally a strong solution of potassium hydroxide. The electrolyte is circulated along the passageway shown as 14 in Figure 1 and enters each individual cell through a slot in each gasket 40 (not shown). During assembly the electrodes and gaskets are first located by means of pins passing through the holes 15 and they are then clamped together in a stack by means of bolts 41 which fit into the cutaway portions 2 and which are provided with nuts 42 at each end. In order to avoid short-circuiting of the stack, the bolts 41 are covered with insulating material where they pass through the cutaway portions 2, while the nuts 42 have insulating washers 43.

Each of the electrodes 1 is, of course, bi-polar, as previously described, but at each end of the stack a uni-polar electrode 45 is, of course, required. This is of the same construction as the electrodes 1 except that a recess is formed in only one side of the supporting plate. Electrical conductors 46 and 47 are then led off from these end uni-polar electrodes. Each of the electrodes 45 is backed by a strong plate 48 through which the bolts 41 pass and against which the nuts 42 press. The electrodes 45 are, of course, insulated from the plates 48 by means of insulating packing 49. The whole assembly is enclosed in an outer casing 50, part of which is broken away for purposes of illustration. This casing is filled with heat insulating material to maintain the battery at its operating temperature.

If the assembly is to be used as a primary battery, oxygen and hydrogen need to be supplied to the electrodes along the passages 11 and 13. In general it is sufficient merely to supply oxygen to replenish that consumed but it is preferable to maintain a continuous circulation of hydrogen in order to carry away the water produced in the form of steam as previously mentioned. When the assembly is to be used as an electrolyser as described in the copending application Ser. No. 679,346, filed August 21, 1957, now U.S. 2,928,783, the gases are, of course, evolved and it is necessary to replenish the electrolyte with pure water along the passageway 14.

In the appended claims the term "solid" as applied to the supporting or backing plate refers to the non-porous character of the plate which prevents gas from moving from one side of the plate to the other.

I claim:

1. An electrode for use in an electrical cell of the oxygen-hydrogen type comprising, a conductive supporting plate having a solid central portion of extended area and a rim portion surrounding said central portion, a multiplex layer of porous nickel fixed to a face of said plate by closely spaced sintered connections covering said central portion, the outer-surface portion of said layer having a lesser pore size than that of the portion adjacent said central portion, said outer-surface portion of lesser pore size being connected to said rim portion throughout its periphery forming a closed gas chamber over said central portion; and means embodied in the electrode providing a fluid passage communicating with said chamber from the outside of said electrode.

2. An electrode as claimed in claim 1 in which the electrode has a porous nickel layer on both faces of said plate and the porous nickel layer intended for contact with oxygen is formed with a coating of lithium-containing nickel oxide.

3. A bi-polar electrode for use in an electrical cell of the oxygen-hydrogen type comprising, a conductive supporting plate having an imperforate solid central portion of extended area and a thickened rim portion surrounding said central portion providing dished recesses on the faces of said plate, a multiplex layer of porous nickel fixed within the recess on each face of said plate by closely spaced sintered connections covering said central portions, the outer-surface portion of said layer having a lesser pore size than that of the portion adjacent said central portion, said outer-surface portion of lesser pore size being connected to said rim portion throughout its periphery forming a closed gas chamber over said central portion and ports formed in said rim portion providing fluid passages between said chambers and the outside of said electrode.

4. A method of forming a bi-polar electrode for use in an electrical cell of the oxygen-hydrogen type comprising, supporting a solid backing plate in a horizontal position, applying a layer of finely divided nickel to the upper surface of said plate, heating said plate and layer to a temperature between about 1325° C. and 1350° C. in a non-oxidizing atmosphere to effect sintering of said layer into a porous mass sintered to the upper face of said plate, applying on top of said first layer a second layer of finely divided nickel of a particle size of 4 to 5 microns, heating said second layer to a temperature between about 950° C. and 1000° C. to effect sintering of the second layer into a sintered layer of smaller pore size than said first layer, said two layers comprising a composite layer intended for contact with oxygen, inverting said plate, applying to the upper face of said inverted plate a layer of a mixture formed of B-nickel powder and 100 to 240 mesh ammonium bicarbonate, heating said mixture layer to a temperature of about 800° C. to effect sintering thereof, applying on top of said mixture layer a layer of finely divided nickel of a particle size of 4 to 5 microns, and heating said second layer to a temperature between about 750° C. and 800° C. to effect sintering thereof to form a composite layer intended for contact with hydrogen.

5. A process according to claim 4 including the further steps of heating said composite layer intended for contact with oxygen in air at about 800° C. to oxidize said layer and maintaining the face of said composite layer intended for contact with hydrogen in a non-oxidizing atmosphere during the time of heating the other layer in oxygen.

6. A method of forming a bi-polar electrode for use in an electrical cell of the oxygen-hydrogen type comprising, supporting a solid backing plate in a horizontal position, forming a first layer of porous nickel intended for contact with oxygen on the upper surface of said plate by a sintering operation carried on at a temperature of between about 1000° C. and 1350° C. in a non-oxidizing atmosphere, inverting said plate, forming a second layer of porous nickel intended for contact with hydrogen on the upper face of said inverted plate by a sintering operation effected at a temperature of about 800° C., inverting said plate and supporting it with said second layer resting upon a horizontal supporting surface, heating said first layer in air at about 800° C. to oxidize said first layer and introducing a non-oxidizing gas between said second layer and said supporting surface while said first layer is being oxidized.

References Cited in the file of this patent

UNITED STATES PATENTS

| 1,211,687 | Dohmen | Jan. 9, 1917 |
| 2,384,463 | Gunn et al. | Sept. 11, 1945 |
| 2,716,670 | Bacon | Aug. 30, 1955 |
| 2,717,872 | Zdansky | Sept. 13, 1955 |

FOREIGN PATENTS

| 17,651/29 | Australia | Jan. 4, 1930 |
| 667,298 | Great Britain | Feb. 27, 1952 |